US012779517B2

(12) United States Patent
Wang et al.

(10) Patent No.: US 12,779,517 B2
(45) Date of Patent: Nov. 3, 2026

(54) METHOD FOR RECYCLING LEAD IODIDE AND SUBSTRATE OF WASTE PEROVSKITE DEVICE

(71) Applicant: Westlake University, Hangzhou (CN)

(72) Inventors: Rui Wang, Hangzhou (CN); Jingjing Xue, Hangzhou (CN); Xu Zhang, Hangzhou (CN); Ke Zhao, Hangzhou (CN)

(73) Assignee: Westlake University, Hangzhou (CN)

( * ) Notice: Subject to any disclaimer, the term of this patent is extended or adjusted under 35 U.S.C. 154(b) by 454 days.

(21) Appl. No.: 18/522,428

(22) Filed: Nov. 29, 2023

(65) Prior Publication Data

US 2024/0100580 A1 Mar. 28, 2024

Related U.S. Application Data

(63) Continuation of application No. PCT/CN2023/086010, filed on Apr. 3, 2023.

(30) Foreign Application Priority Data

Apr. 8, 2022 (CN) ........................ 202210366122.7

(51) Int. Cl.
*B09B 3/80* (2022.01)
*B09B 101/15* (2022.01)
*C01G 21/16* (2006.01)

(52) U.S. Cl.
CPC ................ *B09B 3/80* (2022.01); *C01G 21/16* (2013.01); *B09B 2101/15* (2022.01); *C01P 2002/72* (2013.01); *C01P 2006/80* (2013.01)

(58) Field of Classification Search
CPC ......... B09B 3/80; B09B 2101/15; B09B 3/00; B09B 5/00; C01G 21/16; C01P 2002/72; C01P 2006/80; H10K 85/50; Y02P 70/50
See application file for complete search history.

(56) References Cited

U.S. PATENT DOCUMENTS

| | | | |
|---|---|---|---|
| 2008/0110586 A1 | 5/2008 | Li | |
| 2013/0134048 A1 | 5/2013 | Teamey et al. | |
| 2016/0002853 A1 | 1/2016 | McKeough | |

FOREIGN PATENT DOCUMENTS

| | | | |
|---|---|---|---|
| CN | 111434614 A * | 7/2020 | ............. C01G 21/16 |

* cited by examiner

*Primary Examiner* — Daniel Berns
*Assistant Examiner* — Jaanzeb C Raja
(74) *Attorney, Agent, or Firm* — Hemisphere Law, PLLC

(57) ABSTRACT

Provided is a method for recycling lead iodide and a substrate of a waste perovskite device. The method includes steps as follows: preparing an iodide solution having a set concentration; immersing the waste perovskite device in the iodide solution for dissolution until a perovskite substance of the waste perovskite device is not dissolved, and extracting supernatant; adding water to the supernatant for dilution, and obtaining lead iodide crystals containing a small quantity of impurities; washing the lead iodide crystals containing a small quantity of impurities, adding acid to treat the lead iodide crystals, washing the lead iodide crystals with isopropanol and ether to obtain lead iodide powder, and drying the lead iodide powder to obtain obtaining recycled lead iodide; and cleaning and recycling a substrate generated. The lead iodide is recycled according to Le Chatelier's principle, which achieves safe, environmentally friendly and low-cost recycling.

7 Claims, 4 Drawing Sheets

METHOD FOR RECYCLING LEAD IODIDE AND SUBSTRATE OF WASTE PEROVSKITE DEVICE

BACKGROUND OF THE PRESENT INVENTION

Field of Invention

The present disclosure relates to the field of solar cells, and particularly relates to a method for recycling lead iodide and a substrate of a waste perovskite device.

Description of Related Arts

Perovskite solar cells refer to a third generation of novel solar cells with organic and inorganic hybrid metal halide semiconductors as light-absorbing layers. Since perovskite was first applied to solar cells in 2009, it has attracted extensive attention from scientists and enterprises for its low cost and high efficiency. In just a dozen years, certified photoelectric conversion efficiency of a single perovskite solar cell has arrived at 25.7%, which is comparable to that of a crystalline silicon solar cell. Moreover, the perovskite solar cell has broad commercial application prospects by virtue of a simple production apparatus and process.

By recycling and reusing solar cell materials, environmental pollution can be reduced, an energy payback period (referring to time required for generating energy by solar panels which is equal to energy consumed by producing the solar panels) can be shortened, and cost can be decreased. An assembly of the perovskite solar cell is generally composed of a transparent conductive glass electrode (indium tin oxide (ITO), fluorine-doped tin oxide (FTO) or aluminum-doped zinc oxide (AZO), etc.), charge transport materials (hole and electron transport materials), a perovskite light-absorbing layer, and a counter electrode (Ag, Au, Cu, Al, C, etc.).

Statistically, cost of the transparent conductive glass electrode accounts for approximately 50%-70% of total cost in a production process of the perovskite assembly. Therefore, the production cost will be reduced and the energy payback period will be shortened notably by recycling and reusing the transparent conductive glass electrode. In addition, a large quantity of lead ions in the perovskite are highly toxic to the environment and humanity. Although various effective strategies, such as polymer encapsulation, have been developed in recent years to prevent leakage of lead in devices, a low-cost, environmentally friendly, pollution-free and efficient recycling method for recycling the perovskite assembly, which is an effective way to solve the problem of lead toxicity of commercial perovskite in the future, is still unavailable.

Extremely few methods of recycling a perovskite solar device can be found because few solvents can dissolve the perovskite. At present, only a few solvents such as N, N-dimethylformamide (DMF), dimethyl sulfoxide (DMSO), N-methylpyrrolidone (NMP), gamma butyrolactone (GBL) and ionic liquids can dissolve the perovskite. These solvents are highly toxic, costly, flammable and explosive, and their efficiency of stripping perovskite from a transparent conductive glass electrode is far from satisfactory. In addition, lead iodide is hard to precipitate in a recycling process on account of high boiling points of such organic solvents, so a lead fixation reaction is required for precipitation of lead ions in a recycling solution, and a recycling solvent can be repeatedly used. For example, Huang Jinsong's research group disassembled a perovskite assembly first by DMF before recycling lead ions from a DMF recycling solution by an ion exchange resin (Nature Communication, 2021).

It can be seen therefrom that most current recycling processes, relying on the above-mentioned organic solvents, are complex, costly, and inconducive to large-scale industrial use in terms of economic performance, safety and environmental protection performance. Therefore, exploring a novel, safe, environmentally friendly and low-cost perovskite recycling route has vital practical significance and application value.

SUMMARY OF THE PRESENT INVENTION

An objective of the present disclosure is to provide a method for recycling lead iodide and a substrate of a waste perovskite device, which can be used for recycling lead iodide and a substrate in a perovskite solar cell and has the advantages of environmental friendliness, safety and low cost.

In order to realize the above objective, the technical solution provides a method for recycling lead iodide and a substrate of a waste perovskite device. The method includes steps as follows:

Step 1: preparing an iodide solution having a set concentration;

Step 2: immersing the waste perovskite device in the iodide solution for dissolution until a perovskite substance of the waste perovskite device is not dissolved, and extracting supernatant;

Step 3: adding water to the supernatant for dilution, and obtaining lead iodide crystals containing a small quantity of impurities;

Step 4: washing the lead iodide crystals containing a small quantity of impurities, adding acid to treat the lead iodide crystals, washing the lead iodide crystals with isopropanol and ether to obtain lead iodide powder, and drying the lead iodide powder to obtain recycled lead iodide; and Step 5: cleaning and recycling a substrate generated in Step 2.

In the solution, the lead iodide is dissolved in a high-concentration iodide solution according to Le Chatelier's principle. In an instance with potassium iodide serving as iodide, lead iodide is in a high-concentration iodide (KI) solution, equilibrium shifts forwards, and soluble complex $K_2[PbI_4]$ is generated, of which a chemical reaction equation is: $PbI_2+2KI=K_2[PbI_4]$. Then, the water is added for dilution, such that a concentration of iodine ions is reduced; a chemical reaction equation is: $K_2Pb_4=PbI_2+2KI$; and the lead iodide is separated and purified, such that the lead iodide and the substrate are recycled from the waste perovskite device. A difference between the solution and other lead iodide recycling solutions is that although the potassium iodide in the solution is involved in the reaction, the potassium iodide is conserved before and after the reaction and is not consumed such that cost can be greatly reduced.

In Step 1, the preparing an iodide solution having a set concentration includes steps as follows: adding a proper quantity of iodide to water, and stirring for dissolution to obtain the iodide solution having a set concentration. Potassium iodide, sodium iodide, ammonium iodide, etc. may be selected as the iodide in the solution. In the solution, the concentration of iodide ions in the iodide solution may range from 0.1 M to a saturation level.

In Step 2, when the waste perovskite device is immersed in the iodide solution, it can be observed that the perovskite substance of the waste perovskite device is gradually dissolved, and the substrate is exposed. In the step, a dissolution rate of the waste perovskite substance can be increased through solution stirring, heating or ultrasonic treatment. The waste perovskite device refers to a regular or inverted device and modules thereof.

Certainly, precipitates will be generated in the solution in the step, such as gold and silver electrodes, organic hole transport materials, oxide particles, etc., and precious metal can be recycled through physical and chemical treatment after the precipitates are enriched to a certain quantity. That is, the precipitates obtained in the reaction in Step 2 may be enriched.

The substrate mentioned in the solution includes ITO, FTO, AZO, etc., and may include a silicon cell layer in a perovskite and silicon stacked device, a copper indium gallium selenide cell layer in a perovskite and copper indium gallium selenide stacked device, and the like.

In Step 4, the lead iodide crystals containing a small quantity of impurities are washed with water, and a function of the step is to remove a soluble substance from the lead iodide. In the solution, the lead iodide crystals may be treated by adding a proper quantity of glacial acetic acid or formic acid. The function of the step is to carry out a sufficient reaction so as to remove a small quantity of basic or lead oxide produced in a crystallization process of the lead iodide or a post-treatment process. The lead iodide crystals are washed with isopropanol, such that excess acetic acid and a small quantity of lead acetate are removed, finally the lead iodide crystals are washed with ether, and the powder is put in a vacuum oven at a set temperature for a period of time, such that high-purity lead iodide is obtained.

In the step, the lead iodide crystals can be washed with absolute ethyl alcohol in place of isopropanol.

According to the solution, after the lead iodide in Step 4 and the substrate in Step 5 are obtained, a solution may be prepared by using these recycled materials and fresh materials to produce a perovskite solar cell device.

Compared with the prior art, the technical solution has features and beneficial effects as follows: in the solution, according to Le Chatelier's principle, the lead iodide is in a high-concentration iodide solution, equilibrium shifts forwards, and a soluble complex is formed; and then a concentration of iodine ions is reduced, equilibrium shifts backwards, the lead iodide and iodide are generated, and the lead iodide is recycled. That is, in the solution, lead iodide in perovskite is dissolved in a potassium iodide solution first, such that the soluble complex is generated; then water is added, such that the concentration of iodide ions is reduced, and the lead iodide is separated and purified; and the lead iodide and a substrate are recycled from the waste perovskite device to produce a new perovskite device. Although the iodide solution is involved in the reaction, the material is conserved before and after the overall reaction and is not consumed. The method is simple, easy to operate, low in cost and environmentally friendly. Performance of the device produced from the recycled materials is comparable to that of a device produced from fresh materials. And the method has great commercial application prospects.

It is worth mentioning that the solution avoids the use of toxic DMF or DMSO. Toxic substances are recycled in an environmentally friendly way by using a solubility difference of lead iodide in iodides having different concentrations and skillfully relying on the shift of chemical equilibrium, which is different from existing recycling technologies. Use of toxic organic solvents is avoided, lead and iodine can be completely recycled, and additional iodine source supplement is not required. The iodide used in a recycling process can be reused, such that cost is greatly reduced.

DETAILED DESCRIPTION OF THE PREFERRED EMBODIMENT

Technical solutions of examples of the present disclosure will be clearly and completely described below in combination with accompanying drawings in the examples of the present disclosure. Apparently, the described examples are merely some examples rather than all examples of the present disclosure. All other examples derived by those of ordinary skill in the art on the basis of examples of the present disclosure all fall within the scope of protection of the present disclosure.

Example 1

Figure 1:
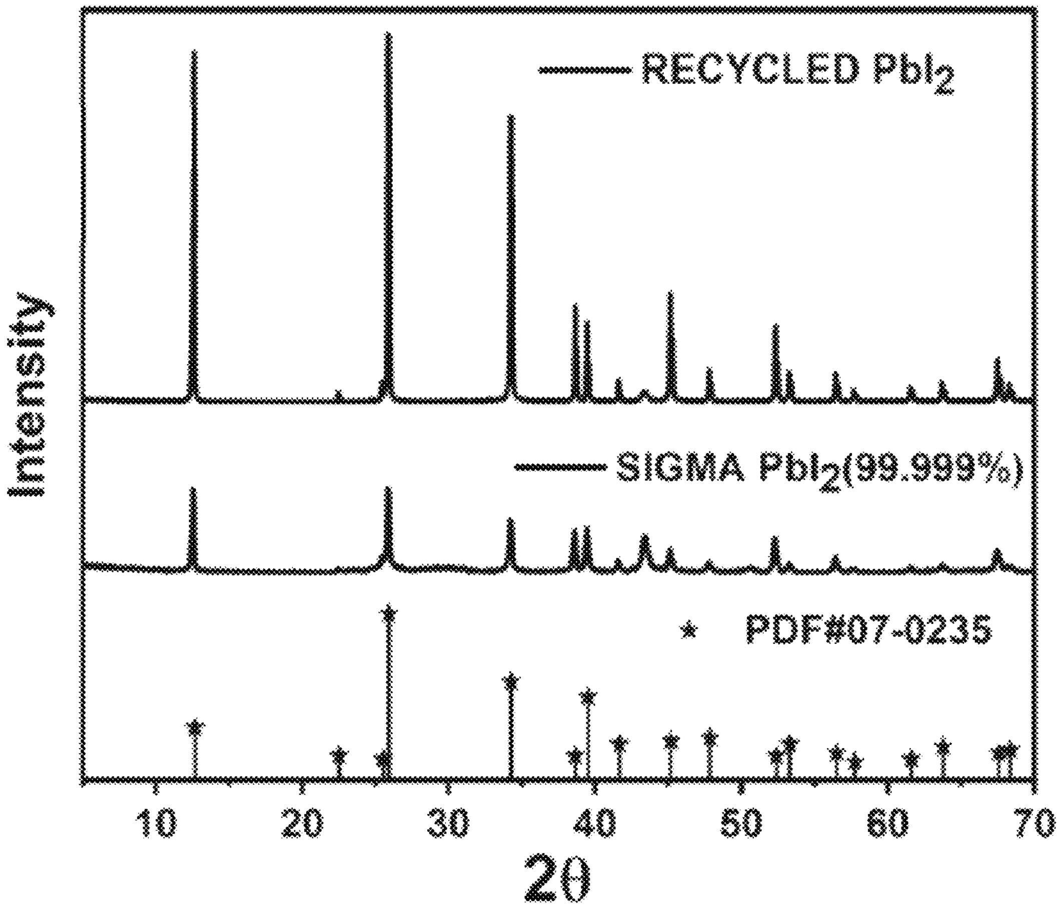
FIG. 1 shows a standard X-ray diffraction (XRD) spectrum of lead iodide and an XRD spectrum of lead iodide recycled through a method of the present disclosure and commercial high-purity lead iodide (SIGMA 99.99%).
Figure 2:
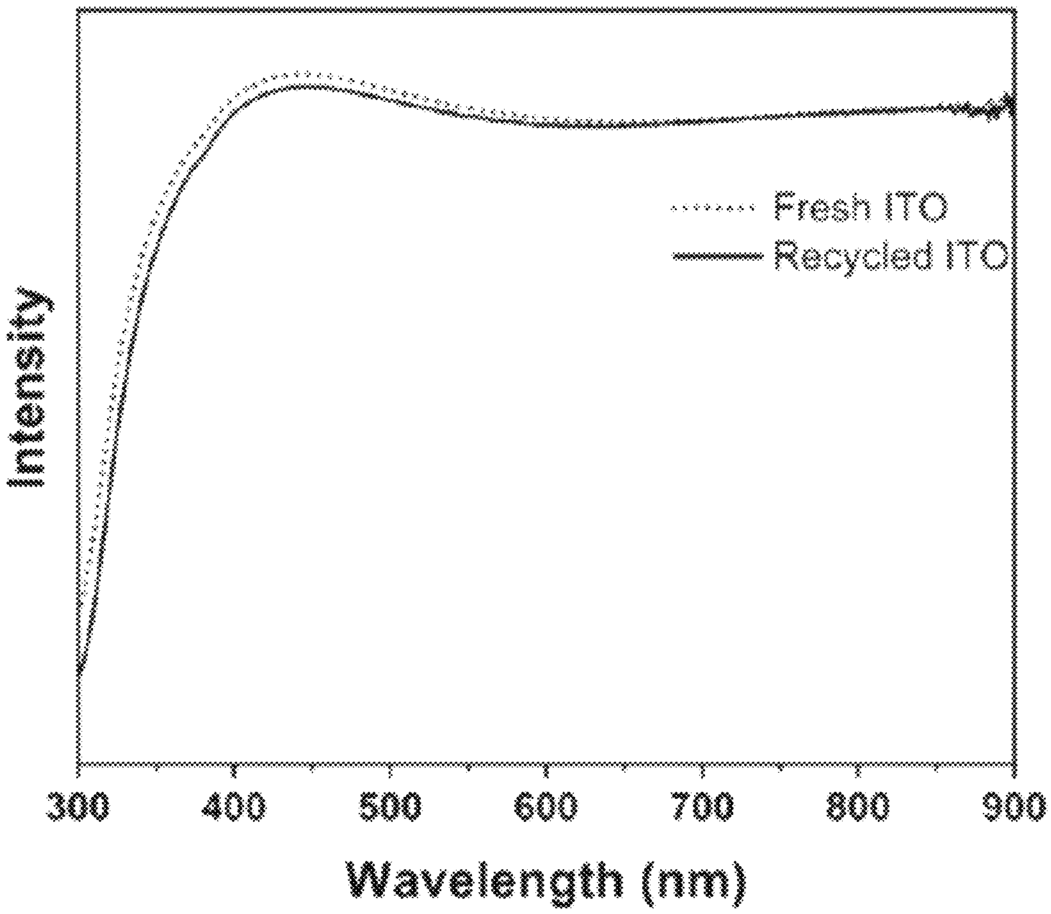
FIG. 2 shows ultraviolet absorption spectra of a transparent conductive glass electrode recycled through a method of the present disclosure and a fresh transparent conductive glass electrode.

Lead iodide and a transparent glass substrate were recycled from a device by using a concentrated solution of potassium iodide, as follows:

Step 1: a potassium iodide solid was added to water at a room temperature, and stirred to be completely dissolved, and a concentrated solution or saturated solution of potassium iodide was prepared;

Step 2: a waste device was immersed in the prepared solution at a room temperature for a certain time; it can be observed that a perovskite substance on an assembly was gradually dissolved, a substrate finally turned into colorless and transparent glass, and when the perovskite substance on the assembly in the solution was not dissolved, it can be assumed that the solution was in a saturated state; and at the time, precipitate B was generated at a bottom of the solution, a supernatant was colorless and transparent C, and the glass substrate was to be further treated;

Step 3: supernatant C was separated out and diluted to a certain concentration by adding water, a golden precipitate generated in the process was low-purity lead iodide, and the generated low-purity lead iodide was to be further treated;

Step 4: a certain quantity of water was added to the low-purity lead iodide for washing, which was to remove a soluble substance from the low-purity lead iodide and repeated for a certain quantity of times; a proper quantity of glacial acetic acid or formic acid was added for further treatment, such that a small quantity of basic or lead oxide generated in a generation process of lead iodide or a post-treatment process was removed;

then washing was carried out with isopropanol, such that excess acetic acid and a small quantity of lead acetate were removed; finally, washing was carried out with ether, and powder was put in a vacuum oven at a set temperature for a period of time, such that high-purity lead iodide was obtained, and an XRD test result thereof is shown in FIG. 1;

Step 5: transparent conductive glass electrodes produced in Step 2 were soaked in a weak acid solution, and cleaned with water, acetone and isopropanol respectively for later use, transmittance of recycled and fresh transparent substrates is tested as shown in FIG. 2, and the transmittance of the recycled substrate is equivalent to that of the fresh substrate; and Step 6: fresh and recycled ITOs were spin-coated with commercial $SnO_2$ at a room temperature according to an experimental standard flow, annealing was carried out at 120° C. for 35 min, and an electron transport layer was produced for later use.

In addition, fresh commercial lead iodide and lead iodide recycled through the method were dissolved in a mixed solvent of DMSO and DMF (volume ratio is 4:1), a mixed solution having a concentration of 1.4 M was prepared, and stirring was carried out on a magnetic stirrer for complete dissolution, such that a clear and transparent solution was obtained.

Moreover, formamidinium iodide (FAI) (100 mg) and methylammonium chloride (MACl) (20 mg) were dissolved in isopropanol (IPA) (1 mL) at a room temperature, and stirring was carried out on a magnetic stirrer for complete dissolution, such that a clear and transparent solution was obtained.

Finally, an ITO substrate of a prepared electron transport layer was spin-coated with the above clear solution through a liquid-phase two-step spin-coating method, heating was carried out at 90° C. for 1 min, and then at 150° C. for 10 min, devices were produced from a fresh substrate, fresh lead iodide, recycled lead iodide and recycled ITO, and then performance of the devices were tested.

Example 2

Lead iodide and a transparent glass substrate were recycled from a device by using a concentrated solution of sodium iodide.

Steps and experimental conditions were the same as those in Example 1, and a difference was that sodium iodide is used as iodide.

Example 3

Lead iodide and a transparent silicon substrate were recycled from a perovskite and silicon cell stacked device by using a concentrated solution of potassium iodide.

Steps and experimental conditions were the same as those in Example 1, and a difference was that a recycled device is a perovskite cell and silicon cell stacked device.

Performance Comparison Experiment:

I. XRD Spectrum Testing:

The applicant carried out XRD spectrum testing on the high-purity lead iodide obtained in Step 4, and sampled commercial high-purity lead iodide (SIGMA 99.99%) for XRD spectrum testing. An obtained XRD spectrum was compared with a standard XRD spectrum, and a comparison result is shown in FIG. 1. It can be seen in combination with FIG. 1 that RECYCLED $PbI_2$ in FIG. 1 represents a standard XRD spectrum of lead iodide, SIGMA $PbI_2$ (SIGMA 99.99%) represents commercial high-purity lead iodide (SIGMA 99.99%), PDF #07-0235 represents lead iodide in the solution, and the recycled lead iodide in the solution has relatively high quality (2θ=43.4 is a background signal of a testing substrate).

II. Ultraviolet Spectrum Testing of Substrate:

The applicant made ultraviolet absorption spectra of a transparent conductive glass electrode recycled in the solution and a fresh transparent conductive glass electrode. As shown in FIG. 2, it can be seen that the substrate recycled through the method presents almost the same transmittance, which indicates feasibility and effectiveness of recycling the substrate through the method.

Figure 3:
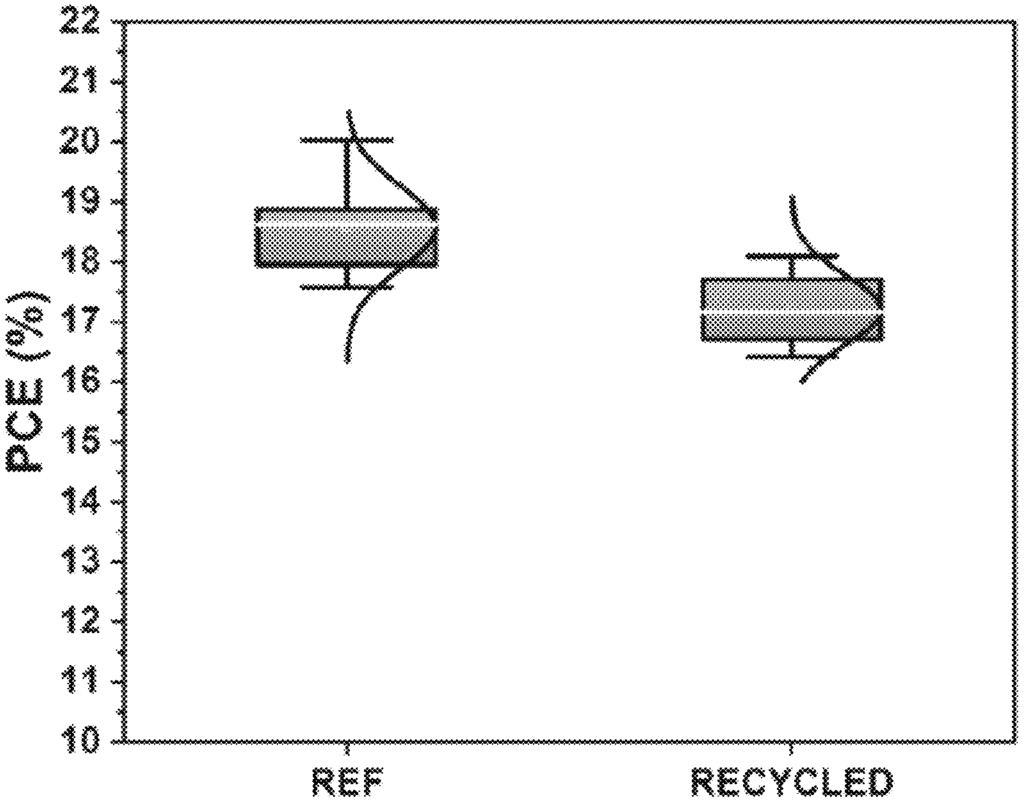
FIG. 3 shows a statistical chart of efficiency of devices produced from a material recycled through a method of the present disclosure and a fresh material.

III. Efficiency Testing of Device:

The applicant produced a new perovskite device by using a substrate and lead iodide recycled in the solution, and compared efficiency thereof with that of a perovskite device produced from a fresh material, and a statistical result is shown in FIG. 3. It can be seen that a reference graph (REF) represents a device produced from fresh lead iodide and a fresh substrate, and average efficiency is 18.5%. An experimental group (RECYCLED) represents a device produced from a recycled substrate and recycled lead iodide, and average efficiency is 17.4%. The efficiency of the device produced from the recycled materials is slightly lower than that of the device produced from the fresh material, but the conversion efficiency is also relatively high.

Figure 4:
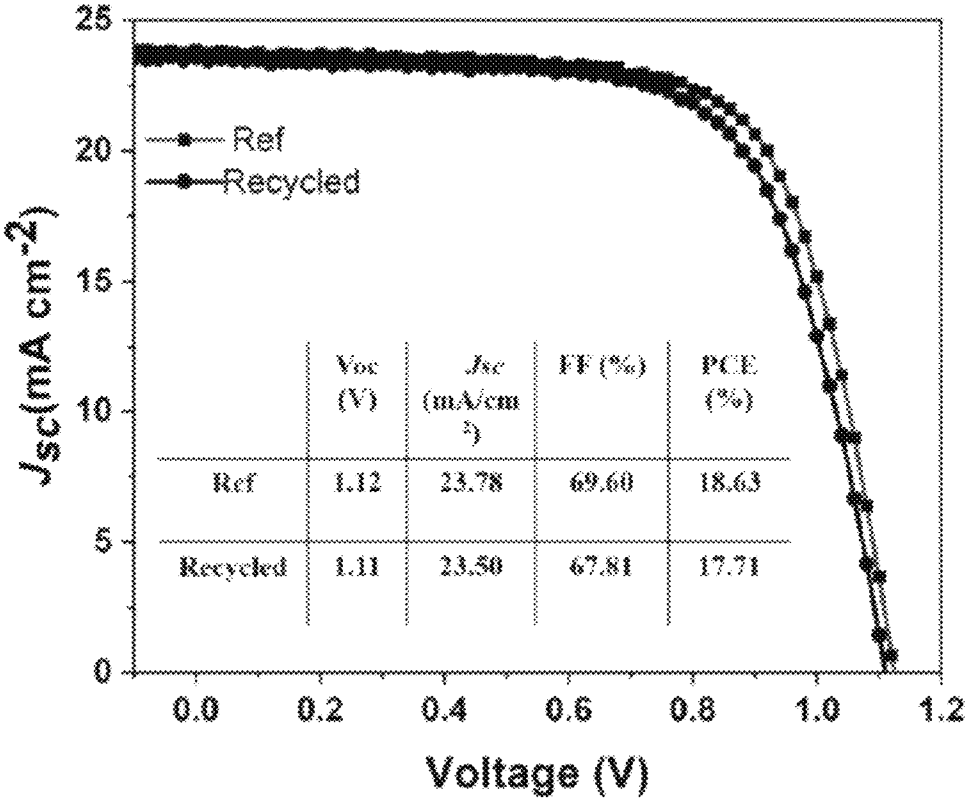
FIG. 4 shows JV curves and performance parameters of devices produced from a material recycled through a method of the present disclosure and a fresh material.

IV. Performance Testing of Device:

The applicant produced a new perovskite device by using a substrate and lead iodide recycled in the solution, and compared performance thereof with that of a perovskite device produced from a fresh material, and a result is shown in FIG. 4. Ref corresponds to a JV curve of a device produced from fresh lead iodide and substrate in Example 1, Recycled corresponds to a JV curve of a device produced from recycled lead iodide and substrate in Example 1, and efficiency of the two devices is 18.63% and 17.71% respectively.

The present disclosure is not limited to the above-mentioned optimum embodiment, and anyone can obtain other products in various forms with the motivation of the present disclosure. However, no matter what change is made in its shape or structure, any technical solution identical or similar to that of the present disclosure falls within the scope of protection of the present disclosure.

The invention claimed is:

1. A method for recycling lead iodide and a substrate of a waste perovskite device, comprising steps as follows:

Step 1: preparing a concentrated solution or saturated solution of iodide, wherein the iodide is one of potassium iodide, sodium iodide and ammonium iodide;

Step 2: immersing the waste perovskite device in the iodide solution to allow a perovskite substance of the waste perovskite device to be gradually dissolved, until dissolution of the perovskite substance of the waste perovskite device no longer occurs to produce an extractable supernatant and a glass substrate of the waste perovskite device becomes transparent, and extracting the supernatant;

Step 3: adding water to the supernatant for dilution, and obtaining lead iodide crystals containing a small quantity of impurities;

Step 4: washing the lead iodide crystals containing a small quantity of impurities, adding acid to treat the lead iodide crystals, washing the lead iodide crystals with isopropanol and ether to obtain lead iodide powder, and drying the lead iodide powder to obtain recycled lead iodide; and Step 5: cleaning and recycling a substrate generated in Step 2.

2. The method for recycling lead iodide and a substrate of a waste perovskite device according to claim 1, wherein according to Le Chatelier's principle, the lead iodide is dissolved in a high-concentration iodide solution, such that a soluble complex is obtained; and water is added for dilution, such that a concentration of iodide ions is reduced, and the lead iodide is recycled.

3. The method for recycling lead iodide and a substrate of a waste perovskite device according to claim 1, wherein in Step 4, the lead iodide crystals containing a small quantity of impurities are washed with water, a proper quantity of glacial acetic acid or formic acid is added to treat the lead iodide crystals, and the lead iodide crystals are washed with the isopropanol and then washed with the ether.

4. The method for recycling lead iodide and a substrate of a waste perovskite device according to claim 1, wherein in Step 4, the lead iodide crystals containing a small quantity of impurities are washed with water, a proper quantity of glacial acetic acid or formic acid is added to treat the lead iodide crystals, and the lead iodide crystals are washed with absolute ethyl alcohol and then washed with the ether.

5. The method for recycling lead iodide and a substrate of a waste perovskite device according to claim 1, wherein the substrate is one of indium tin oxide (ITO), fluorine-doped tin oxide (FTO) and aluminum-doped zinc oxide (AZO).

6. The method for recycling lead iodide and a substrate of a waste perovskite device according to claim 1, wherein the substrate is one of a silicon cell layer in a perovskite and silicon stacked device and a copper indium gallium selenide cell layer in a perovskite and copper indium gallium selenide stacked device.

7. The method for recycling lead iodide and a substrate of a waste perovskite device according to claim 1, wherein a perovskite device is produced from the lead iodide obtained in Step 4 and the substrate obtained in Step 5.

* * * * *